United States Patent [19]
Belenkiy et al.

[11] Patent Number: 5,465,313
[45] Date of Patent: Nov. 7, 1995

[54] OPTICAL FIBER CONNECTOR AND METHOD OF FABRICATING SAME

[75] Inventors: Yuriy Belenkiy, Niles; Igor Grois, Northbrook; Irina L. Gumin, Skokie; Ilya Makhlin, Wheeling; Mark Margolin, Lincolnwood; Michael J. Pescetto, Hanover Park, all of Ill.

[73] Assignee: Molex Incorporated, Lisle, Ill.

[21] Appl. No.: 268,155

[22] Filed: Jun. 29, 1994

[51] Int. Cl.⁶ ..................................... G02B 6/36
[52] U.S. Cl. ................................. 385/80; 385/84
[58] Field of Search ................. 385/60, 66, 68, 385/72, 76, 78, 80, 84

[56] References Cited

U.S. PATENT DOCUMENTS

| | | | |
|---|---|---|---|
| 4,333,705 | 6/1982 | Mead | 385/80 |
| 5,222,169 | 6/1993 | Chang et al. | 385/87 |
| 5,283,849 | 2/1994 | Cooke et al. | 385/77 |
| 5,285,510 | 2/1994 | Slaney | 385/76 |
| 5,287,425 | 2/1994 | Chang | 385/81 |

Primary Examiner—Akm E. Allah
Assistant Examiner—John Ngo
Attorney, Agent, or Firm—A. A. Tirva

[57] ABSTRACT

An optical fiber connector assembly includes a housing having a forward end, a rearward end and an axially extending passageway therethrough. A ferrule assembly is mounted within the passageway and includes a forwardly projecting ferrule near a forward end of the connector assembly for axially receiving the fiber end of an optical fiber cable inserted into the passageway from the rearward end of the housing. A tube is removably positioned in the passageway, with a front end of the tube at the ferrule assembly and a rear end of the tube exposed at the rearward end of the housing for receiving epoxy injected into the tube. Therefore, the connector assembly can be substantially assembled and transported with the tube in position in the passageway, the epoxy later can be injected through the tube to the ferrule assembly. The tube then can be removed and the optical fiber cable can be inserted into the passageway into engagement with the injected epoxy.

10 Claims, 4 Drawing Sheets

OPTICAL FIBER CONNECTOR AND METHOD OF FABRICATING SAME

FIELD OF THE INVENTION

This invention generally relates to the field of optical fiber connectors and, particularly, to a fiber optic connector assembly which includes a unique system for applying epoxy internally of a substantially assembled connector, including for field applications.

BACKGROUND OF THE INVENTION

Fiber optic connector assemblies, such as a conventional optical fiber SC type connector, generally include some sort of generally hollow housing which mounts an interior ferrule assembly. The ferrule assembly includes a forwardly projecting ferrule, such as of ceramic material, for receiving the bare fiber end of an optical fiber cable inserted into a rear end of the housing. The housing normally includes a passageway; the ferrule assembly includes a passage; and the ferrule, itself, includes a hole, all of which are coaxially aligned through the connector assembly. A spring, such as a coil spring, normally is sandwiched between the ferrule assembly and the housing to spring-load the forwardly projecting ferrule. The connector assembly may include an outer shell or coupling nut, a rear crimping tube, as well as a rear strain relief boot. All of these various components, in one form or another, are fairly conventional in these types of optical fiber connector assemblies.

A major problem in assembling and using optical fiber connectors, as described above, involves storing, shipping and handling all of the various components of the connector. In addition, epoxy is used extensively in assembling the connectors, particularly in holding the optical fiber cable within the connector. It is quite typical for a manufacturer to manufacture all of the components which then are stored separately until assembly with an optical fiber cable. The multiple components then are transferred to a work station for assembly. Or, the multiple components are shipped to a customer where the optical fiber cable is installed. Or the multiple components are shipped to the field where a field operator assembles the components and installs the optical fiber cable. Storage, shipping and handling of such multiple components generally is very inefficient and expensive, in addition to the costs involved in maintaining so many components in inventory.

In addition, when epoxy is used to install an optical fiber cable in a connector during assembly, there is a tendency for the epoxy to migrate into areas of relative movement within the connector assembly. In other words, as stated above, the forwardly projecting ferrule or the entire ferrule assembly is spring-loaded to afford relative movement of the ferrule/ferrule assembly and the housing component or components of the connector. If some of the epoxy "freezes" these relatively movable components, the entire connector assembly is defective. Controlled application of the epoxy in situations wherein the connector, itself, also must be assembled is very difficult, particularly for field applications.

This invention is directed to solving the various problems outlined above by providing a unique system wherein an implement, such as a tube, is removably assembled with the connector assembly, itself, to facilitate applying epoxy interiorly of a pre-assembled connector.

SUMMARY OF THE INVENTION

An object, therefore, of the invention is to provide a new and improved optical fiber connector assembly of the character described above, and including a method of manufacturing or fabricating the assembly.

In the exemplary embodiment of the invention, an optical fiber connector includes housing means having a forward end, a rearward end and an axially extending passageway therethrough. A ferrule assembly is mounted within the passageway and includes a forwardly projecting ferrule near a forward end of the connector for axially receiving the fiber end of an optical fiber cable inserted into the passageway from the rearward end of the housing means.

The invention contemplates providing a tube removably positioned in the passageway in the housing means, with a front end of the tube at the ferrule assembly and a rear end of the tube exposed at the rearward end of the housing means for receiving epoxy injected into the tube. Therefore, the connector assembly can be substantially assembled and transported with the tube in position in the passageway; the epoxy later can be injected through the tube to the ferrule assembly; the tube can be removed; and the optical fiber cable can be inserted into the passageway into engagement with the injected epoxy.

As disclosed herein, the ferrule assembly includes a plug having an axially extending cable-receiving passage that is aligned with the passageway in the housing means. The ferrule projects forwardly of the plug and has a fiber-receiving hole that is aligned with the passage. The tube extends through the passageway and into abutment with the plug about the passage therein. Preferably, the plug includes a recess for sealingly receiving the front end of the tube. Actually, an interior interface is formed between the housing and the ferrule assembly and whereat relative movement therebetween takes place. The tube extends past the interface to prevent epoxy from moving to or through the interface.

Lastly, the tube extends rearwardly beyond the rearward end of the housing. The tube preferably is transparent to afford visual inspection of the amount of epoxy therewithin.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
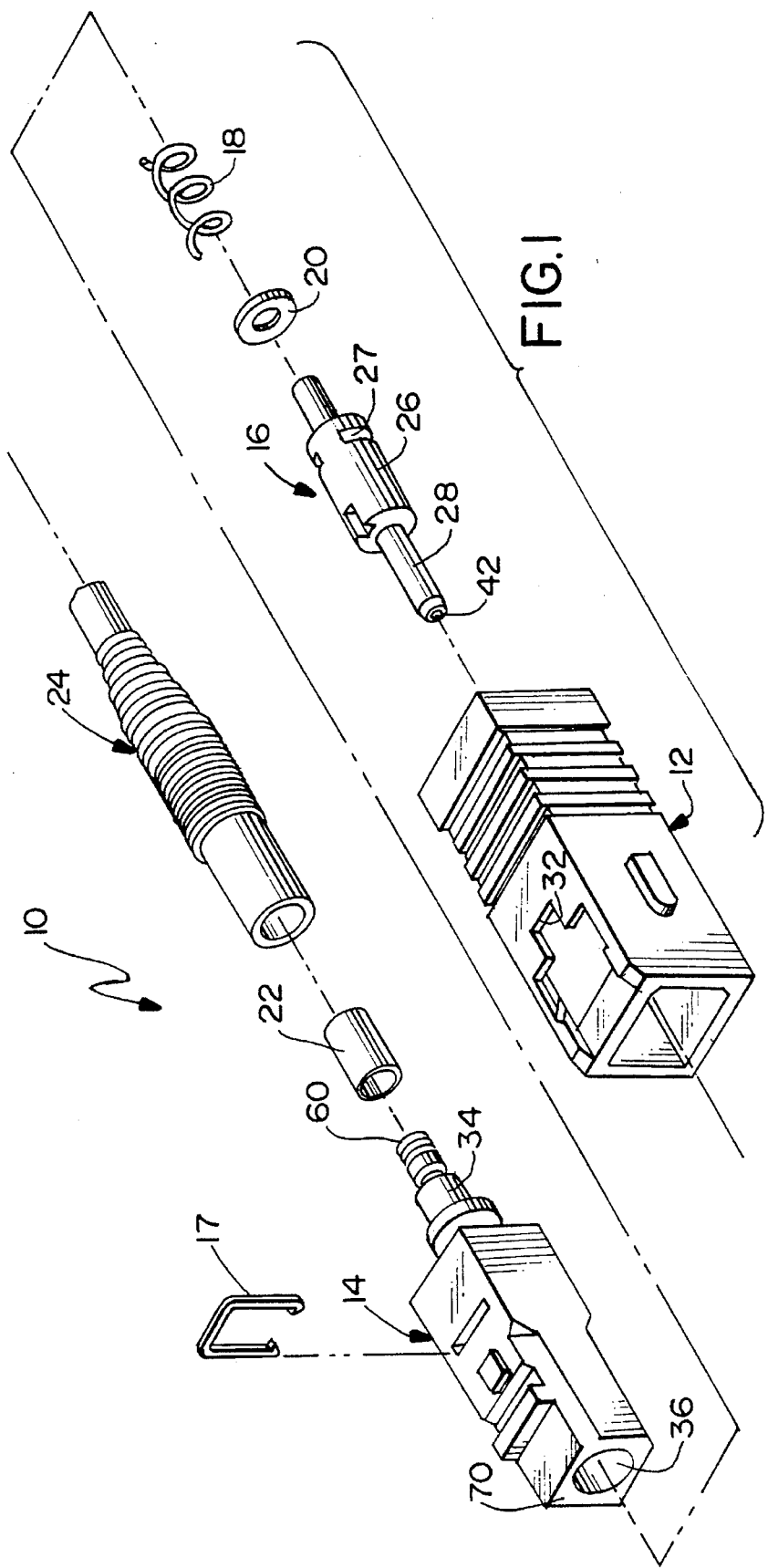
FIG. 1 is an exploded perspective view of an optical fiber connector assembly with which the invention is applicable.
Figure 2:
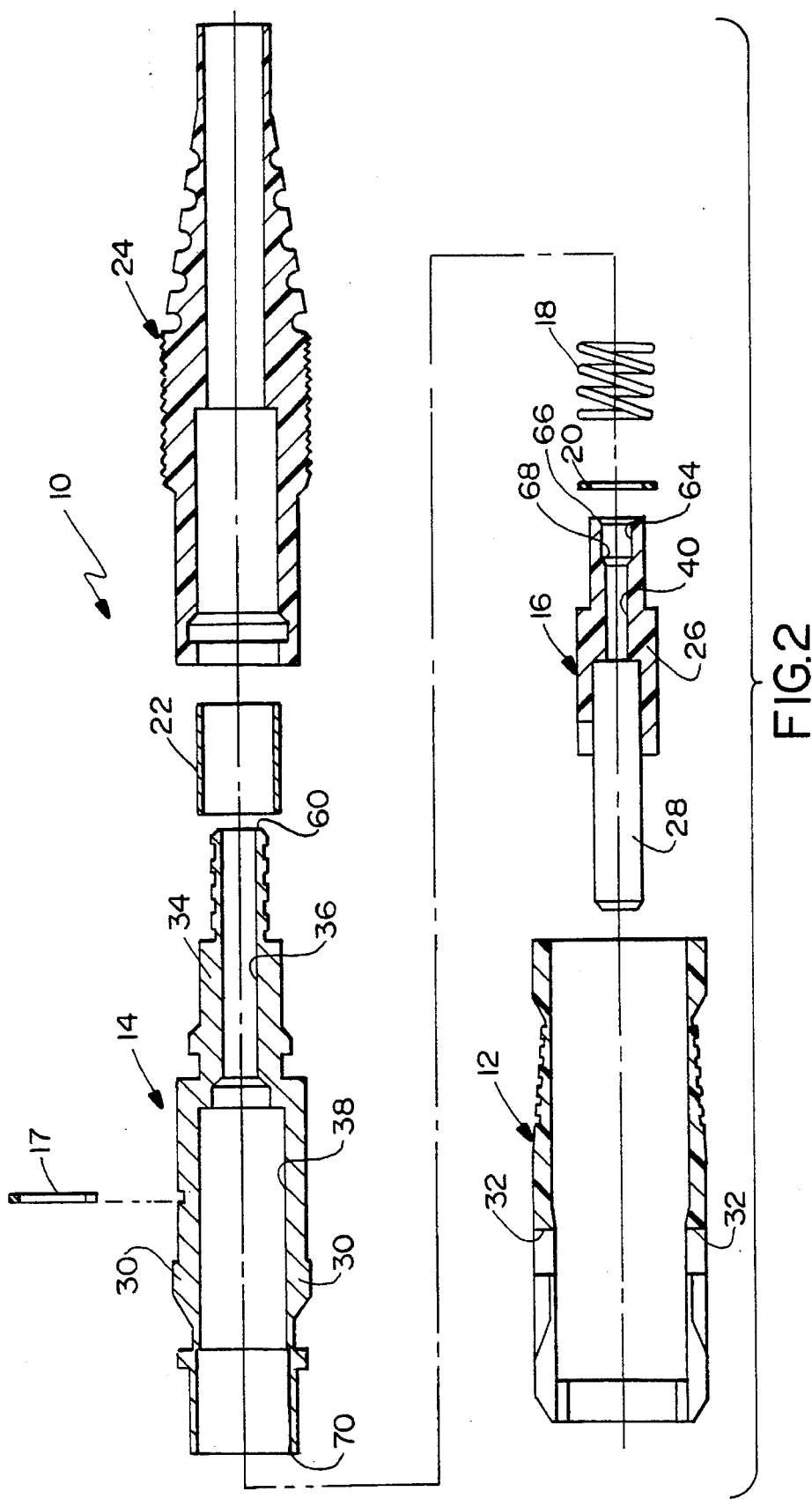
FIG. 2 is an exploded axial section through the connector assembly.

Referring to the drawings in greater detail, and first to FIGS. 1 and 2, the invention is embodied in an optical fiber connector assembly, generally designated 10, which includes an outer shell, generally designated 12, an inner housing, generally designated 14, and a ferrule assembly, generally designated 16, mounted within housing 14 and retained within the housing 14 by a clip 17. A coil spring 18 is sandwiched between housing 14 and ferrule assembly 16 to provide for relative movement therebetween, as will be described in greater detail hereinafter. A washer 20 is sandwiched between the coil spring and the ferrule assembly. A rear crimping tube 22 is provided for crimping the strength members of the optical fiber cable, and a strain relief boot 24 surrounds the cable, all of which will be described hereinafter. Lastly, ferrule assembly 16 includes a plug portion 26 and a forwardly projecting ferrule 28.

Outer shell 12 is a one-piece structure unitarily molded of dielectric material such as plastic or the like. Inner housing 14 is a one-piece structure unitarily fabricated of metal material, such as die cast zinc. Plug portion 26 of ferrule assembly 16 is unitarily molded of dielectric material, such as plastic or the like, and ferrule 28 is fabricated of ceramic or like material. Coil spring 18, washer 20, clip 17 and crimping tube 22 are fabricated of metal material. Strain relief boot 24 is fabricated of a flexible material of a rubber-like or plastic nature.

Figure 3:
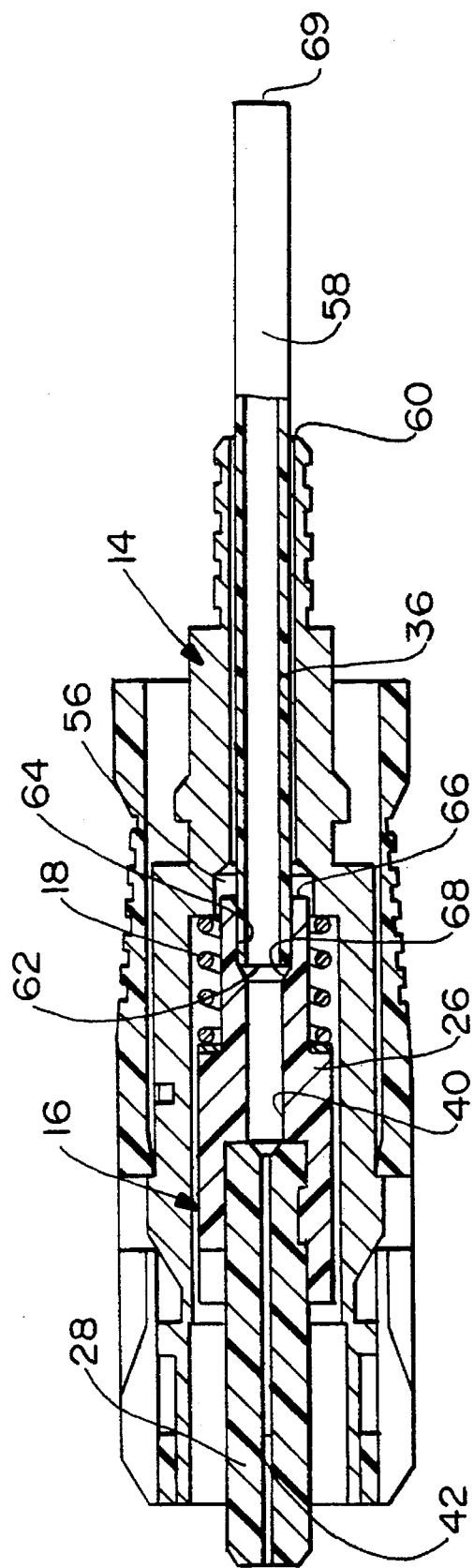
FIG. 3 is an axial section through the connector assembly, substantially assembled except for the boot and crimping tube, and with the epoxy-injecting tube in place.
Figure 4:
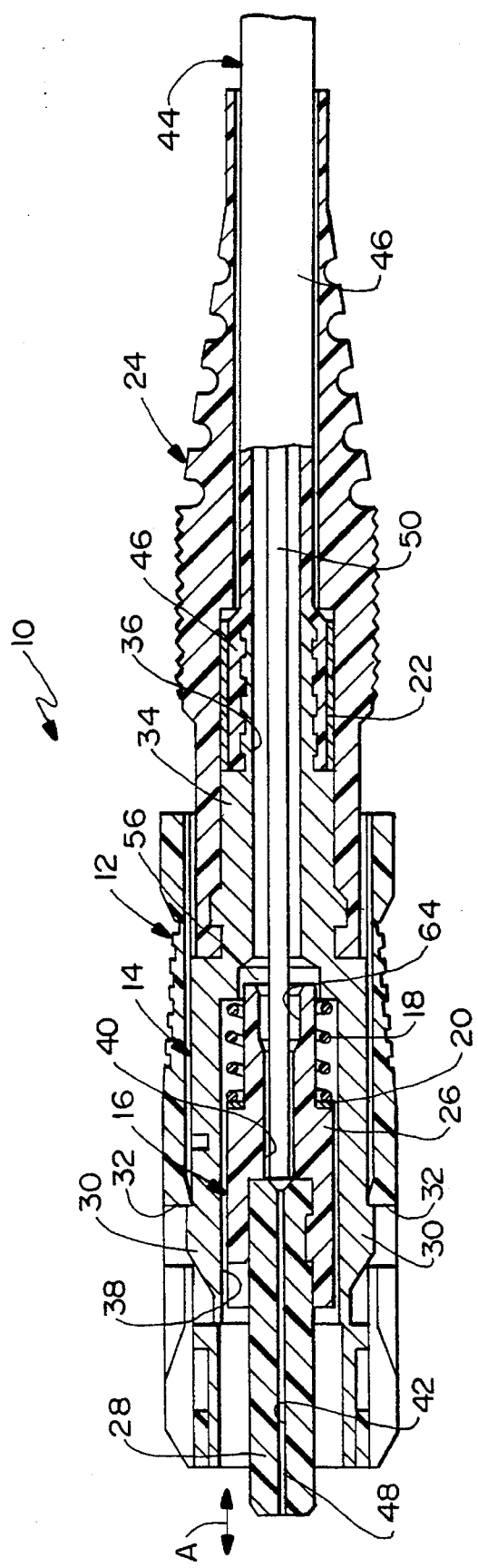
FIG. 4 is an axial section through the completely assembled connector assembly, with the optical fiber cable in position.

Before proceeding with a description of the invention as is depicted in FIG. 3, reference is made to FIG. 4 which shows optical fiber connector assembly 10 in fully assembled condition. It can be seen that ferrule assembly 16 is mounted within housing 14 and retained therein by clip 17 which engages grooves 27 in plug portion 26. The housing 14, in turn, is mounted within shell 12. The housing has a pair of snap-latch protuberances 30 which engage within apertures 32 of shell 12. The housing has a rearwardly extending barrel portion 34 which defines a passageway 36 extending forwardly to an enlarged cavity area 38 of the passageway which receives ferrule assembly 16. Plug 26 of the ferrule assembly includes an axial passage 40, and ferrule 28 includes an axial hole 42, whereby passageway 36 of the housing, passage 40 of the plug and hole 42 of the ferrule all are coaxially aligned through the connector assembly for receiving portions of the optical fiber cable.

More particularly, still referring to FIG. 4, an optical fiber cable, generally designated 44, is of conventional construction and includes an outer plastic sheath 46 and a bare fiber end 48 which is disposed within hole 42 of ferrule 28. The inner fiber of the cable is surrounded by a dielectric cladding 50. Although not shown in the drawings, strength members, such as a braid, may be provided between outer sheath 46 and inner cladding 50. A shielding foil also may be provided between those components, all of which is conventional in the field.

FIG. 4 shows that outer cladding 46 (along with any strength members) is located about barrel portion 34 of housing 14 and inside metal crimping tube 22. The crimping tube 22 is mechanically crimped onto the sheath to effectively grip the composite cable. Dielectric cladding 50 and the inner fiber extend forwardly through passageway 36 in housing 14 and through passage 40 in plug 26 of the ferrule assembly. The bare fiber end 48 then extends through hole 42 in ferrule 28.

Lastly in referring to FIG. 4, it can be seen that coil spring 18 is sandwiched between housing 14 and plug 26 of ferrule assembly 16 to spring-load the ferrule assembly. Therefore, ferrule 28 and fiber end 48 (along with the entire ferrule assembly) can move relative to housing 14, shell 12, etc. as indicated by double-headed arrow "A".

As stated in the "Background", above, epoxy is used extensively in the assembly of optical fiber connectors, particularly in holding the inner components of the optical fiber cable within the connector. More particularly, epoxy conventionally is injected into passage 40 within plug 26 of the ferrule assembly, and the epoxy migrates into hole 42 in ferrule 28. Therefore, when the optical fiber cable is inserted or assembled within the connector as shown in FIG. 4 and described above, the bare fiber end and a portion of the cladding 50 adjacent thereto, are fixed by the epoxy within the ferrule assembly. Considerable problems are encountered in applying the epoxy both during manufacture as well as in field assembly which is quite prominent. If the epoxy migrates out of its intended locations, the entire connector assembly can be rendered defective. For instance, an interface area 56 (FIG. 4) is defined between ferrule assembly 16 and housing 14. Should epoxy migrate into this area and into cavity 38 about coil spring 18, the coil spring could be rendered immobile and, thereby, render the entire connector assembly defective.

Referring to FIG. 3, the invention contemplates substantially assembling the connector assembly, (i.e. except for crimping tube 22 and strain relief boot 24) and installing a tube 58 made of Teflon® material or the like through a rearward end 60 of housing 14. This assembly as shown in FIG. 3 provides for a number of advantages. In particular, it can be seen that the connector assembly is substantially assembled. This can be performed at the manufacturing point, and this assembly can be shipped to other work stations, to customers and/or to personnel out in the field. Such an assembly avoids maintaining inventories of all of the separate components, such as outer shell 12, inner housing 14, ferrule assembly 16, coil spring 18 and washer 20. This also obviates the necessity of field personnel or assembly customers in having to assemble all of these components.

The assembly shown in FIG. 3 also is fabricated with tube 58 in position. The tube is provided for facilitating the injection of epoxy into ferrule assembly 16, past the other components of the assembly, in a neat and precise manner. Once the epoxy is injected through the tube into the ferrule assembly, the tube is removed, and optical fiber cable 44 (FIG. 4) and its various components can be assembled as described above, fixing the cable in place by the injected epoxy and crimping tube 22.

More particularly, it can be seen that a front end 62 of tube 58 is fitted into a recess 64 at a rear end 66 of plug 26 of ferrule assembly 16. Actually, recess 64 is an enlarged portion of passage 40 through the plug. The recess is sized to allow free insertion of the inner end of tube 58 therein, but the recess is not large enough for any epoxy to pass outwardly therefrom. In addition, recess 64 is chamfered, as at 68, to provide an inwardly oblique surface against which inner end 62 of tube 58 can abut and seal. Sealing is achieved by light press fit of tube 58 into the end of the plug 26. Therefore, a positive sealing means is provided to prevent epoxy from migrating outwardly into interface area 56 toward coil spring 18 and the other interior components of the connector assembly. Once epoxy is injected into passage 40 and hole 42 of the ferrule assembly, the tube is removed and the assembly is ready to immediately receive the optical fiber cable. Tube 58 does not get wet with epoxy due to the property of Teflon® material or the like.

A feature of the invention includes providing tube 58 of a sufficient length so that a rear end 69 of the tube projects outwardly beyond rearward end 60 of housing 14 as can be seen in FIG. 3. Preferably, the tube is transparent. Therefore, with the transparent tube projecting rearwardly of the housing, visual inspection can be made to ensure that epoxy has been injected through the tube if the tube is filled at least to the visually observable projecting portion thereof.

Lastly, the invention contemplates a method of assembling optical fiber connector assembly 10. The method will be set forth, as follows, and sets forth a general summary of the structural features of the invention. More particularly, the method includes the steps of providing housing 14 with a forward end 70 and rearward end 60 with the axially extending passageway 36 therethrough. Ferrule assembly 16 is mounted in the passageway, with the ferrule assembly including forwardly projecting ferrule 28 for axially receiving fiber end 48 of optical fiber cable 44 inserted into the passageway from the rearward end of the housing. Tube 44 is inserted into the passageway from the rearward end of the housing until front end 62 of the tube is located in recess 64 of plug 26 of ferrule assembly 16. Epoxy is injected through the tube to the ferrule assembly. The tube then is withdrawn, and the optical fiber cable is installed into the connector assembly and secured therein by the epoxy and crimping tube 22.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a partial optical fiber connector assembly which includes, a housing having a forward end and an axially extending passageway therethrough, a ferrule assembly inserted into said passageway from the forward end of said housing, said ferrule assembly having a spring providing a biasing force and a means for maintaining said ferrule assembly in said housing, a ferrule positioned at the front end of said ferrule assembly and extending out of the forward end of said housing for axially receiving a fiber end of an optical fiber cable inserted into said passageway from the rearward end of the housing, an outer shell having a forward end and a rearward end movably mounted about said housing, wherein the forward end of said shell is in its most forward position substantially flush with the forward end of said housing, and the rearward end of said housing extends past the rearward end of said shell, wherein the improvement comprises a tube removably positioned in said passageway with a front end of the tube at the ferrule assembly and a rear end of the tube exposed at the rearward end of the housing for receiving epoxy injected into the tube, wherein said ferrule assembly includes a chamfered recess for sealingly receiving the front end of the tube, whereby the connector assembly can be transported with the tube in a position in the passageway, epoxy later can be injected through the tube to the ferrule assembly, the tube can be removed and the optical fiber end of the optical fiber cable can be inserted into the passageway into engagement with the injected epoxy.

2. In an optical fiber connector as set forth in claim 1, wherein an interior interface is formed between the housing and the ferrule assembly, and said tube extends past the interface to prevent epoxy from moving to or through the interface.

3. In an optical fiber connector as set forth in claim 1, wherein said tube extends rearwardly beyond the rearward end of the housing.

4. In an optical fiber connector as set forth in claim 3, wherein said tube is translucent to afford visual inspection of the amount of epoxy therewith.

5. In an optical fiber connector as set forth in claim 4, wherein said tube is made of Teflon® material or the like.

6. In an optical fiber connector as set forth in claim 4, wherein said tube has its inside diameter coated with Teflon® material or the like.

7. A method of assembling an optical fiber connector assembly, comprising the steps of:

providing a housing means with a forward end, a rearward end and an axially extending passageway therethrough;

mounting a ferrule assembly in said passageway, with the ferrule assembly including a forwardly projecting ferrule for axially receiving the fiber end of an optical fiber cable inserted into the passageway from the rearward end of the housing means;

inserting a tube into the passageway from the rearward end of the housing means until a front end of the tube is located at the ferrule assembly;

injecting an epoxy through the tube to the ferrule assembly;

withdrawing the tube; and inserting the optical fiber cable into the passageway into engagement with the epoxy until the fiber end is located in said ferrule.

8. The method of claim 7, including inserting the tube into sealing engagement with the ferrule assembly.

9. The method of claim 7, wherein said tube is made of Teflon® material or the like.

10. The method of claim 7, wherein said tube has its inside diameter coated with Teflon® material or the like.

* * * * *